A. F. McCOLLUM.
PILE CUTTING ATTACHMENT FOR LOOMS.
APPLICATION FILED JAN. 31, 1912.

1,049,891.

Patented Jan. 7, 1913.

A. F. McCOLLUM.
PILE CUTTING ATTACHMENT FOR LOOMS.
APPLICATION FILED JAN. 31, 1912.

1,049,891.

Patented Jan. 7, 1913.

A. F. McCOLLUM.
PILE CUTTING ATTACHMENT FOR LOOMS.
APPLICATION FILED JAN. 31, 1912.

1,049,891.

Patented Jan. 7, 1913.

UNITED STATES PATENT OFFICE.

ALFRED F. McCOLLUM, OF BLOOMSBURG, PENNSYLVANIA, ASSIGNOR OF THREE-FIFTHS TO JAMES MAGEE, 2D, OF BLOOMSBURG, PENNSYLVANIA.

PILE-CUTTING ATTACHMENT FOR LOOMS.

1,049,891.  Specification of Letters Patent.  Patented Jan. 7, 1913.

Application filed January 31, 1912.  Serial No. 674,441.

*To all whom it may concern:*

Be it known that I, ALFRED F. McCOLLUM, a citizen of the United States, residing in Bloomsburg, Columbia county, Pennsylvania, have invented certain Improvements in Pile-Cutting Attachments for Looms, of which the following is a specification.

My invention relates to weaving and consists of a pile cutting attachment for looms of the same general type as shown in the United States patent granted to me on Sept. 16, 1902, No. 709,447.

The chief object of my invention is to construct a durable pile cutting attachment for looms which will be of simple construction and facilitate the manufacture of cut-pile fabrics.

Another object is that the pile after being cut by my improved cutting attachment will present an even surface and will be practically finished when taken from the loom.

Other objects and advantages will be brought out in the following specification, reference being had to the accompanying drawings in which—

Fig. 5, is a view similar to Fig. 4 showing certain of the movable parts in a different position. Fig. 14, is a perspective view of an adjustable connecting rod which forms one of the features of my invention; and Figs. 15, 16, 17 and 18, are views of modifications.

Figure 1:
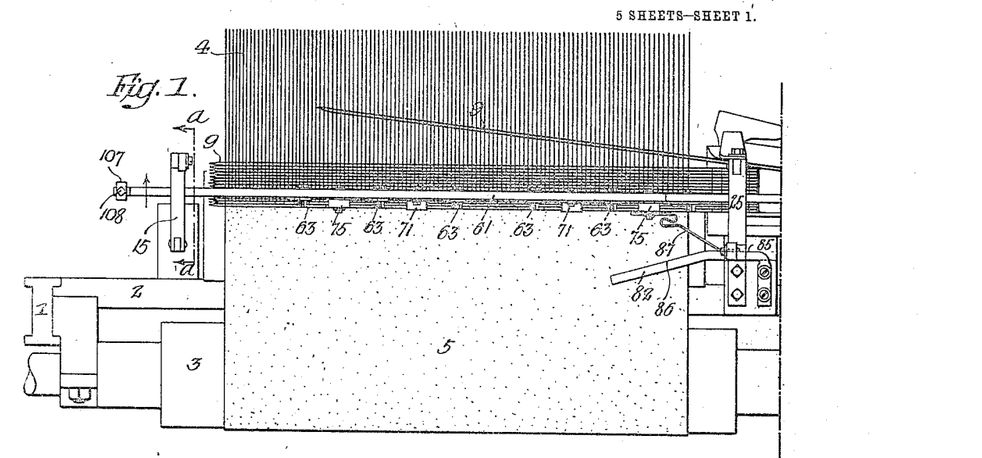
Figures 1 and 1ª show a plan view of sufficient of a loom to illustrate my invention.
Figure 1A:
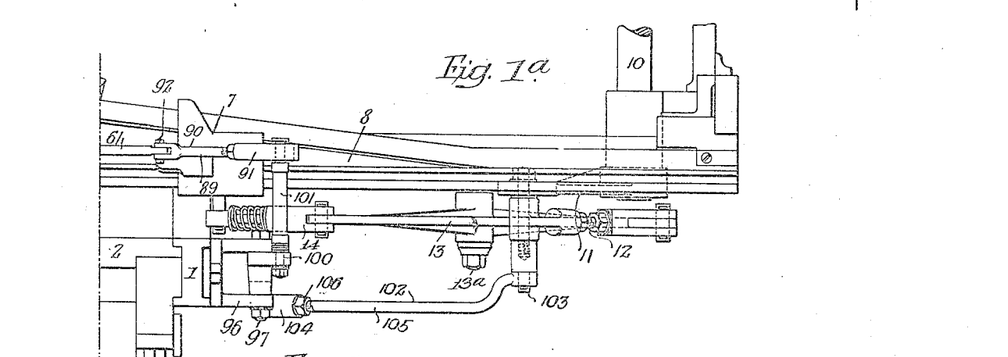

Referring to the drawings, 1 is the loom frame which forms the support for the breast beam 2 and breast roller 3 and pile forming warps 4, when cut in a manner hereinafter described, coöperate to form the finished fabric as shown at 5. The frame 1 has an extension 6 which forms a support for a slide 7 and a wire switch 8. The slide 7 is adapted to move back and forth along the extension 6 and is provided with mechanism for actuating pile wires 9 in the usual manner of pile wire weaving. In the present instance the slide 7 receives its motion from a crank shaft 10, crank 11, link 12, bell crank lever 13, and a connecting rod 14. The bell crank lever 13 is pivoted at 13ª at a point below the shaft 10, in order to give the slide 7 a rapid forward movement to insert the pile wires between the successive sheds of the warp; and a slow rearward movement to remove the pile wires after the fabric has been woven and cut.

The foregoing elements are of usual construction, and I do not claim them as a part of my invention.

Mounted upon one side of the frame 1, is a guide frame 15, which is grooved at 16 and 17 to form guideways; the portion of the frame having the groove 17 is pivoted at 18 and is held in its normal position (see Fig. 6) by a clasp 19 having a slot 20 through which passes a clamp screw 21. A slidable block 22 has wedge-shaped extensions 23 and 24, which extend into the grooves 17 and 16 respectively, so that the said block is free to slide in directions parallel with the grooves 17 and 16. The second frame 25 is mounted on the opposite side of the frame 1 and is grooved at 26 and 27 to form guideways; a portion of the frame having the groove 27 is pivoted at 28 and is held in its normal position (see Figs. 4 and 5) by a clasp 29 having a slot 30 through which passes a clamp screw 31. A slidable block 32 has wedge-shaped extensions 33 and 34 which extend into the grooves 27 and 26 respectively of the frame 25, so that the said block is free to slide in directions parallel with grooves 27 and 26.

Figures 6, 7, 8:
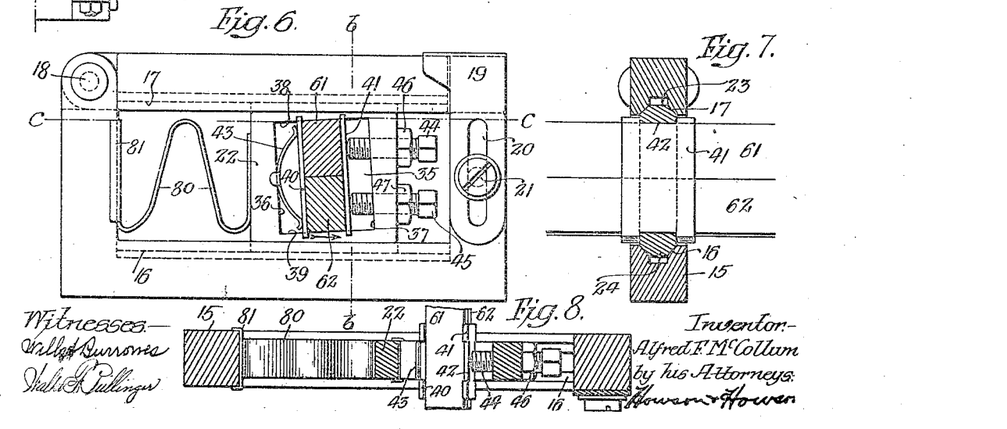
Fig. 6, is an enlarged sectional view taken on the line *a—a* Fig. 1 and showing a guide frame which I employ.
Fig. 7, is a sectional view taken on the line *b—b* Fig. 6.
Fig. 8, is a sectional view taken on the line *c—c* Fig. 6.

The block 22 is provided with an aperture 35; said aperture having two opposite faces 36 and 37 which run at a slight incline to the vertical, and two opposite faces 38 and 39 which run at an incline to the horizontal, as clearly shown in Fig. 6. Two friction plates 40 and 41 span the aperture 35 and are cut away at 42, so as to prevent them from slipping out of the aperture 35. A flanged compression spring 43 acts upon the friction plate 40 and tends to move the latter away from the face 36. Two screw bolts 44 and 45 are mounted within the block 22 and serve to bear upon and to move the friction plate 41 away from the face 37; lock nuts 46 and 47 mounted on the screw portion of the bolts serve to keep the said bolts in the desired positions.

Figure 4:
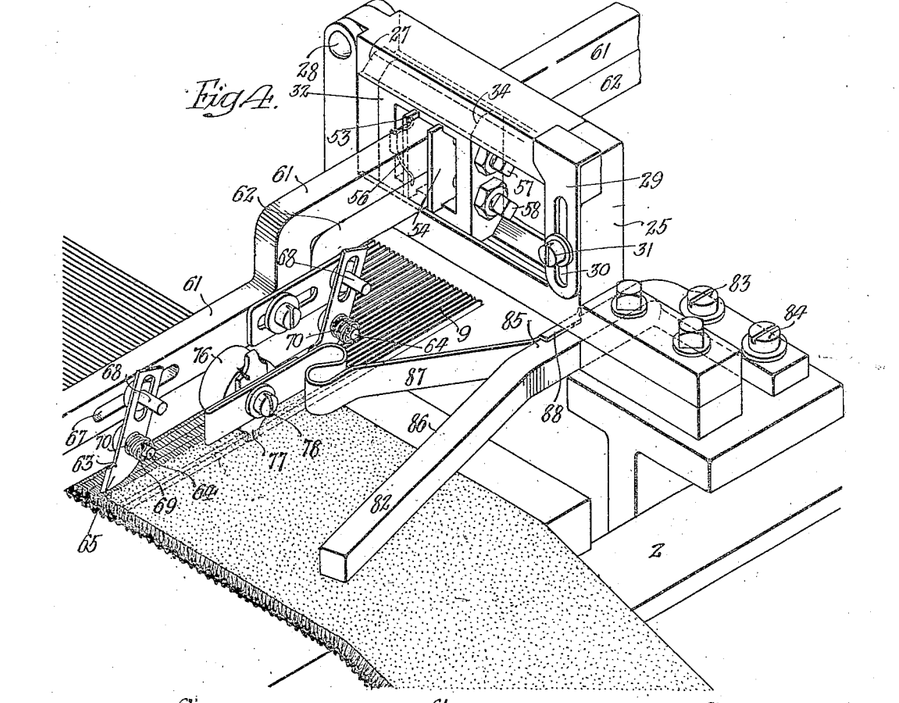
Fig. 4, is a perspective view of a portion of my invention.
Figures 5, 15, 16:
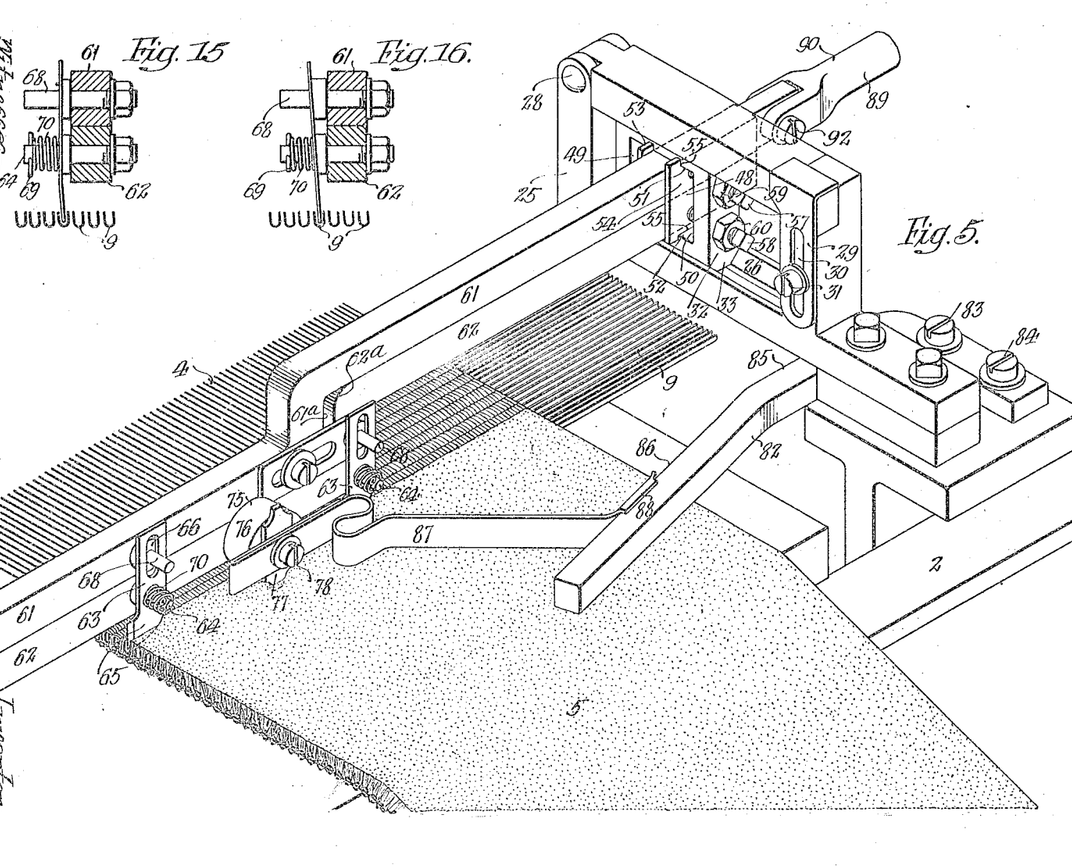

The block 32 is provided with an aperture 48; said aperture having two opposite faces 49 and 50 which run at a slight incline to the vertical, and two opposite faces 51 and 52 which run at an incline to the horizontal, as clearly shown in Figs. 4 and 5. Two friction plates 53 and 54 span the apertures 48 and are cut away at 55, so as to prevent them from slipping out of the aperture 48. A flanged compression spring 56 Fig. 4 acts upon the friction plate 53 and tends to move the latter away from the face 49. Two screw bolts 57 and 58 are mounted within the blocks 32 and serve to bear upon and move the friction plate 53 away from the face 49; lock nuts 59 and 60 mounted on the screw portion of the bolts serving to keep the said bolts in the desired positions.

A bar 61 is slidably superimposed upon a bar 62 and the bars in this state pass between the friction plates 40 and 41, and 53 and 54, and the faces 38, 39 and 51, 52 of the blocks 22 and 32 respectively and form a knife carrier as clearly shown in Figs. 2, 4, 5 and 6, and are thus slidably suspended above the surface of the pile warps 4.

The compression springs 43 and 56 are preferably made of a curved strip steel as shown in Fig. 6 so that their ends press against the upper and lower portion of the friction plates.

A plurality of pile cutting knives 63 are pivoted on studs 64 which project from the bar 62. The blades 63 have hooked ends 65, as clearly shown in Fig. 4, and are slotted at 66. The bar 61 has a plurality of slots 67 therein, one for each knife 63. A stud 68 is adjustably mounted within each slot 67, and passes through the slot 66 of the respective knife 63. A pin 69 extends through each stud 64 adjacent the outer end; and the spring 70 bears between each pin and the knife to keep the latter in frictional contact with the bar 62; by having a knife edge hooked in this manner the same will when in an operative position cut at an incline to the line of travel, which will be more fully explained hereinafter.

The pile wires 9, after being inserted within the respective sheds of the pile warp and bound in by the closing of said sheds, will lie directly below the bars 61 and 62 as clearly shown in Figs. 9, 11, 12, and 13. The pile wires 9 which are in the present instance shown U-shaped in cross sections, tend to lean in a direction toward the breast beam in actual practice; this is due to the beat-up action of the lay and if cut by vertical knives, directly in the middle of the groove produce a pile which is higher on one edge of the cut than on the other. By having the faces 36 and 37, and 49 and 50 of the blocks 22 and 32 respectively at a slight angle to the vertical and to the faces 38 and 39, and 51 and 52, the bars 61 and 62 and the knives thereon will tend to lean in a manner clearly shown in Figs. 6, 11, 12 and 13 which is substantially equal to the tilt of the pile wires 9 caused by the beat up of the lay. Thus with this latter construction it will be understood that when the cutting edges of the knives are lowered into the groove of the wires as hereinafter more fully explained, the said cutting edges will be substantially parallel with and equidistant from the wire and will cut an even pile (see Figs. 9 and 11).

Plates 71 are provided with slots 72 and guard shoes 73, these plates 71 are placed between certain of the knives 63 and are attached to the bar 62 by bolts 74 passing through the slots 72. The shoes 73 are arranged, as clearly shown in Fig. 12, and serve to protect the cutting edges of the knives 63, in case the pile wires 9 should spring out of their prescribed path during their withdrawal. Any number of its guards may be used, two being shown in the drawings.

Gages 75 comprising rollers or disks 76 and fingers 77 and 77ᵃ are adjustably connected to the bar 62 by bolts 78 passing through slots 79 of the said fingers and central-bores in the disks 76. A compression spring 80 having a flanged end 81 is mounted between the frame 15 and the block 22 and tends to move the block 22 and consequently the bars 61 and 62 in a direction indicated by the arrows in Figs. 1 and 6. A cam bar 82 is secured by bolts 83 and 84 or other means to the side of the loom frame 1, and adjacent the guide frame 25; the cam bar 82 has a portion 85 which may be substantially parallel with the pile wires 9 when the latter are bound within the fabric, and a portion 86 which runs at an angle from the portion 85 toward the breast roller as clearly shown in Fig. 1.

Attached to the bar 62 by one of the bolts 78 is a spring 87 which has its free end flanged at 88 to form a shoe which is slidable on the cam bar 82 as clearly shown in Figs. 4 and 5.

A connecting rod 89 comprising a threaded stem 90 and a head 91 into which the threaded stem extends, is pivoted at 92 to the end of the bar 61, and provided with a lock nut 93; the latter serving to lock the stem 90 to the head 91 after adjustment. The head 91 is provided with an elongated opening or slot 94 having a passage 95 leading thereto. Mounted on the side of the frame 1 adjacent the connecting rod 89 is a bracket 96 having a bolt or pin 97 which forms a pivot for a lever 98; the latter having two arms 99 and 100. Secured to the free end of the arm 100 is a projection or pin 101 adapted to pass through the passage 95 and operate within the slot 94.

A link 102 is pivotably connected at the free end of the arm 99 and to a pin 103 adjustably connected to the crank 11. The link 102 in the present instance is made in two sections 104 and 105 adjustably screwed together by a nut 106. A slide 107 is adjustably screwed to the end of the bar 62 by a set screw 108 and forms a stop for the bar 61, in a manner hereinafter described.

Figure 10:
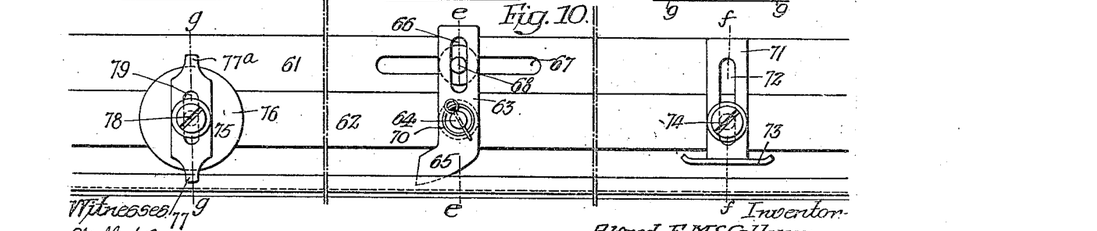
Fig. 10 is a face view of one portion of my invention.
Figure 11:
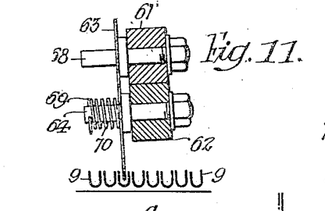
Fig. 11, is a sectional view taken on the line *e—e* Fig. 10.
Figure 12:
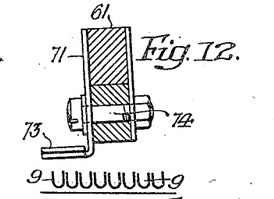
Fig. 12, is a sectional view taken on the line *f—f* Fig. 10.
Figure 13:
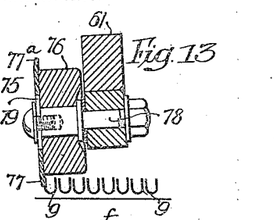
Fig. 13, is a sectional view taken on the line *g—g* Fig. 10.

The operation is as follows: The wires 9 having been inserted and interwoven as shown in several views of drawing, the connecting rod 89 is lowered from the position shown in Fig. 2$^a$ in dot and dash lines to the position shown in full lines in the same figure, so that the pin 101 will engage the slot 94. The crank 11 having a rotary motion will impart a rocking motion to the lever 98 which in turn will impart a reciprocable motion to the bar 61, the length of the slot 94 will allow the bar 61 to remain idle during a portion of the movement of the said lever 98, as it is obvious that as the pin 101 is moving from one end of the slot to the other, there will be no motion imparted to the said bar 61, the reason for this feature of my invention will be more fully discussed hereinafter. The first part of the movement of the bar 61 in the direction of the arrow indicated in Fig. 3, which direction hereinafter will be termed "forward movement", will cause the knife edges of the blades to descend into the groove of one of the wires 9 as clearly shown in Figs. 9, 10, and 11, owing to the fact that the pins 68 tend to rock knives 65 from the normal position to that shown in Fig. 5. The friction exerted by the plates 40, 41, 53 and 54 upon the bars 61 and 62 is sufficient to prevent the movement of the said bar 62 during the first movement of the bar 61 just described, so that it is obvious if the pins 64 remain stationary and the pins 68 press against the sides of the slots 66 in the knives 65, that the latter will be moved into substantial vertical positions, and allow their cutting edges to extend into the grooves of the wires described above. The slide 107 is preferably so placed upon the bar 62 that as soon as the cutting edges 65 of the blades 63 are in their proper position within the groove of a wire 9, the end $x$ of the bar 61 will abut the said slide 107 and a continued forward movement of the lever 98 will move both the bars 61 and 62 forward, and as the pile warps 4 bridge the grooves of the pile wires 9, the same will be cut by the knife edges 65 as clearly shown in Fig. 5. I preferably adjust the wire inserting and withdrawing mechanism, which latter may be of any well known type, so that at least two wires remain within the cut portion of the fabric while the third wire is being cut, and by so doing, I am able to form a gage for the proper positioning of the blades 65, as the fingers 77 and 77$^a$ are adapted to slide along the outside face of the first wire as clearly shown in Fig. 13, while the blades 63 are moving within the third wire as shown in Fig. 11. The rollers or disks 76 tend to keep the fabric and wires level and also to keep the wires 9 from springing out of their prescribed alinement. If it would be desired to cut on any other wire than the third as shown in the drawings the fingers 77 and 77$^a$ could be adjusted toward or from the bar 62 as desired. After the bars 61 and 62 have finished their forward movement during which time they have received a bodily movement toward the breast roll, due to the "take up" of the finished fabric, the lever 98 will start moving in the direction as shown by the arrow in Fig. 3 but, as the pin 101 has to travel the length of the slot 94, there will be no rearward motion imparted to the bar 61 until the slide 7 will have time to withdraw the first wire to a point clear of the guiding means. Thus it will be seen that when the slide 7 starts to withdraw the first wire the spring pressed shoe 88 is resting against the portion 86 of the cam bar 82 so that the finger 77$^a$ will exert very little friction against the first wire while the latter is being withdrawn. This construction and arrangement of the cam bar 82 and the spring-pressed shoe 88 has the advantage of preventing an undue amount of friction from being exerted upon the finger 77$^a$ after the end of a wire has been moved past the finger 77; thereby preventing the rapid wearing of the wires which would cause an uneven pile and change the alinement of the wires and blades. After the first wire has been withdrawn to a point clear of the guiding means as mentioned above the pin 101 will have moved to the end of the slot 94 and will then move the connecting rod 89 and the bar 61 in the direction indicated by the arrow in Fig. 3, which direction will hereinafter be termed "rearward motion". During the first part of the rearward motion, the friction exerted by the plates 40, 41, 53 and 54 is also sufficient to prevent movement of the bar 62, so that again it is obvious that as the pins 64 remain stationary and the pins 68 move rearwardly, the blades 63 will be rocked so as to raise their cutting edges 65 out of the groove of the respective pile wire 9 as shown in Fig. 4. When the bar 61 has moved rearwardly until the shoulder 61ª thereon abuts the shoulder 62ª of the bar 62, a continued motion of the lever 98 will move both bars 61 and 62 so that the spring-pressed shoe 88 will ride on the cam bar 82 toward the high portion 85, and thereby force the finger 77ª into contact with the outer face of the first wire 9. The spring 80 which contacts with the block 22 tends to move the finger 77 also into engagement with the next wire. Thus the rearward movement of the bars 61 and 62 together with the action of the spring 80 and the spring pressed shoe 88 and cam bar 82, tend to move the knives in the direction opposite to the "take up" after each first wire is withdrawn and into contact with the first of the wires remaining in the fabric. By this arrangement the fabric surface is not marred or mussed as the pressure of the fingers 77 and 77ª against the next wire is gradual owing to the gradual angle of the cam bar 82, and the knives are always in the proper position to enter the grooves of the respective wires.

The guard shoes 73, which are supported by the bar 62 between the knives 63, act to prevent the end of a wire, during its withdrawal, from rising out of its prescribed path and injuring the knives.

By having one side of the frames 15 and 25, pivoted, the said side can be readily removed to expose the blocks 22 and 32; the latter together with the bars 61 and 62 being bodily removable. A varied amount of pressure can be exerted upon the plates 40, 41, 53 and 54 by adjusting the bolts 44, 45, 57 and 58, to increase the amount of friction on the bars 61 and 62. Also the bars 61 and 62 may receive a greater or less tilt by adjusting the said bolts. This latter can be done without varying the constant pressure on the bars 61 and 62 owing to the fact that the springs 43 and 56 will rock on the inner surface of the blocks 22 and 32.

While I have shown means for inclining the bars 61 and 62, it will be understood that other and equivalent constructions can be used, for example, by inclining the plates themselves or by bending the cutting end of the knives so that they will enter the grooves of the wires parallel to the sides thereon. Two instances of these constructions are shown in Figs. 15 and 16.

By moving the knife bars with a positive action controlled by the crank shaft, the loom can be run exceptionally fast without jarring or breaking the knives and the cutting edges of the knives will always be within the grooves of the wires before the fast bodily movement of the knife bars.

Figure 2:
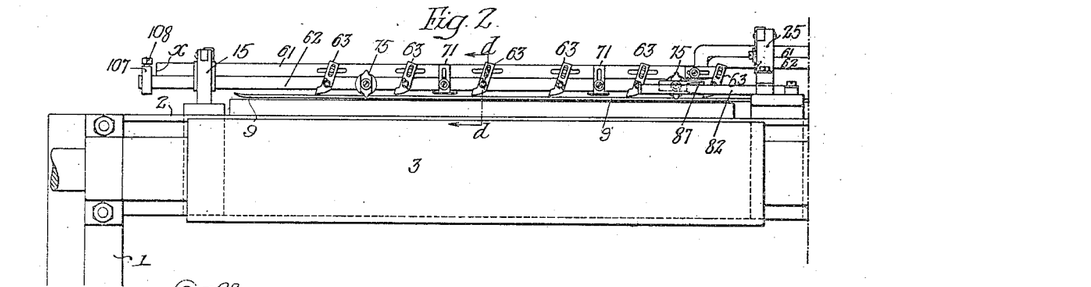
Figs. 2 and 2ª show a front elevation view of the same with the woven fabric removed.
Figures 2A, 14, 17, 18:
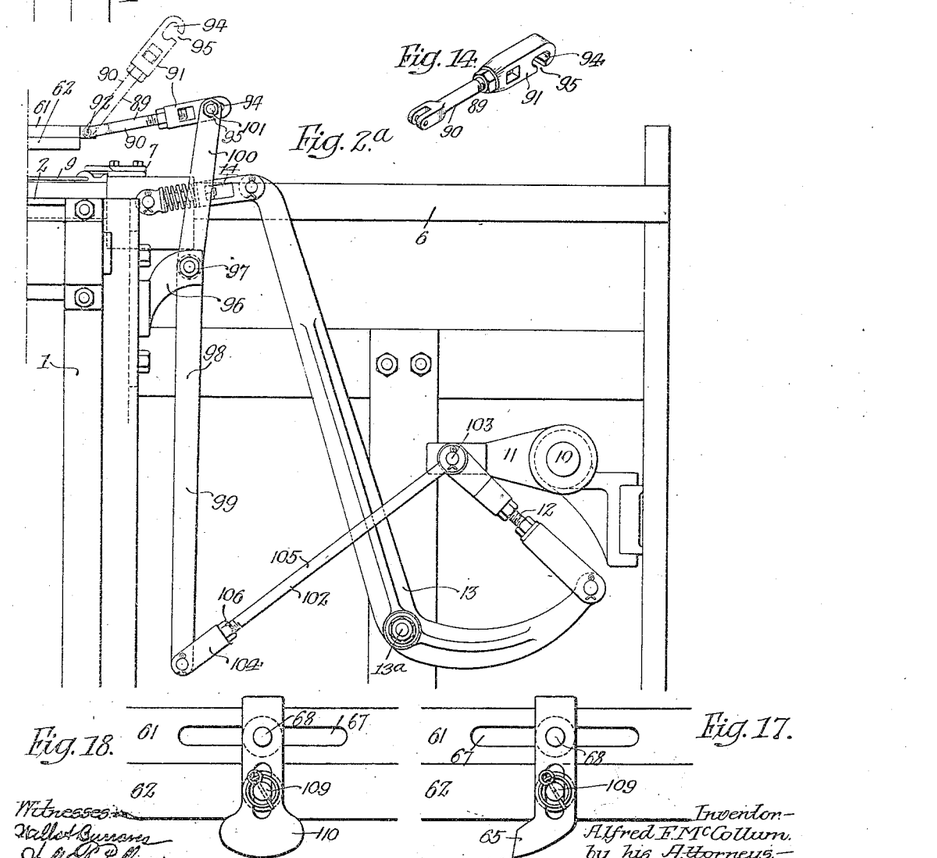
Figures 3, 9:
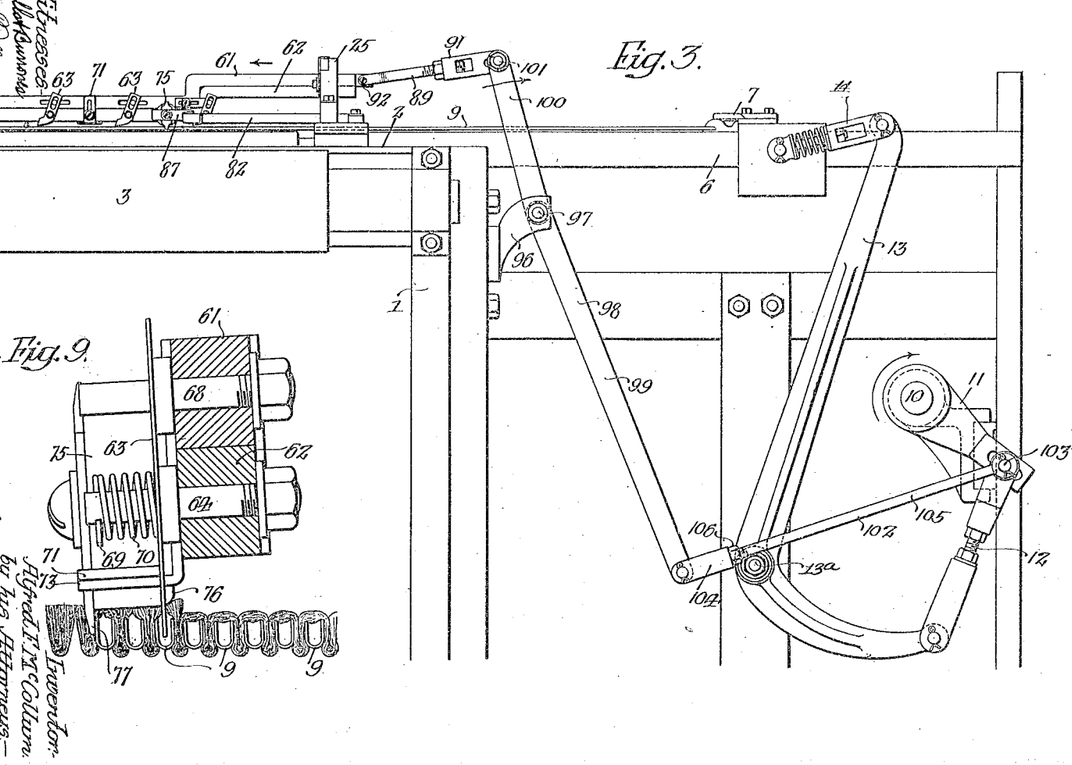
Fig. 3 is a view similar to Figs. 2 and 2ª showing the movable parts in a different position.
Fig. 9, is an enlarged sectional view taken on the line *d—d* Fig. 2 showing the effect of certain of the elements upon a fabric.

In Fig. 17, I have shown the blade pivoted to the bar 61 and slotted to be engaged by a pin 109 projecting from the lower bar 62. By having this construction, instead of having a direct pivotal action of the blade, the latter has a movement which is a combination of a pivotal and raising and lowering movement and is particularly useful when cutting yarn of a delicate or soft texture. Also by having the cutting edge of the blade shaped as shown at 110 in Fig. 18, I attain a cutting surface which is large and free of projections. This form of blade is particularly useful to cut pliable or other yarn which would tend to resist the direct upward movement of the cutting surface.

I claim—

1. The combination in a loom for weaving pile fabrics of the pile wire; means for inserting and withdrawing the pile wire; a knife-carrier; a knife mounted on the carrier and movable adjacent the pile wire to cut the pile warp; means carried by a knife-carrier and engaging the pile wire after the pile thereon has been cut to guide the movement of the knife.

2. The combination, in a pile cutting mechanism for looms, of the pile wire; a knife carrier; knives for cutting the pile and mounted on the carrier; knife-guiding means carried by the knife carrier; means for pressing the guiding means in contact with the pile wire; means for decreasing the intensity of the pressure of the guiding means against the pile wire before the latter is withdrawn; and means for increasing the intensity of the pressure against the wire.

3. The combination in a loom for weaving pile fabrics of pile wire; means for inserting and withdrawing the pile wire; a knife-carrier; a knife mounted on the carrier and movable adjacent the pile wire to cut the pile warp; means for tilting the knife with respect to the tilt of the wire caused by the beat-up of the fabric.

4. The combination in a loom for weaving pile fabrics of a pile wire; said pile wire having a groove formed therein; means for inserting and withdrawing the pile wire; a knife-carrier; a knife mounted on the carrier and movable within the said groove of the pile wire to cut the pile warp; means for tilting the knife with respect to the tilt of the wire caused by the beat-up of the fabric.

5. The combination in a loom for weaving pile fabrics of the pile wire; means for inserting and withdrawing the pile wire; a knife-carrier; a knife mounted on the carrier and movable adjacent the pile wire to cut the pile warp; and a knife guard mounted above the pile wire.

6. The combination, in a pile cutting mechanism for looms, of the pile wire; knives for cutting the pile; guiding means for the knives; means for moving and pressing the guiding means in contact with the pile wire; and means for decreasing the intensity of the pressure of the guiding means against the pile wire before the latter is withdrawn.

7. The combination in a loom for weaving pile fabrics of the pile wire; means for inserting and withdrawing the pile wire; a knife-carrier; a knife mounted on the carrier and movable adjacent the pile wire to cut the pile warp; means for grinding the knife and operable against the wire; means for moving the knife-carrier said latter means providing for a dwell of the said knife-carrier until the free end of the wire is withdrawn to a point beyond said knife-guiding means.

8. The combination, in a loom for weaving pile fabrics, of the pile wire; means for inserting and withdrawing the pile wire; a knife carrier; guiding means carried by the knife carrier; means for moving and pressing the guiding means in contact with the pile wire; means for decreasing the intensity of the pressure of the guiding means against the pile wire before the latter is withdrawn; and means for moving the knife carrier and causing a dwell of the latter while the guiding means is under the control of the said pressure decreasing means and during the withdrawal of each wire until the latter has been withdrawn to a point clear of the guiding means.

9. The combination in a loom for weaving pile fabrics of the pile wire; means for inserting and withdrawing the pile wire; a knife-carrier; a knife mounted on the carrier; a connecting-rod connected to the carrier and having a slot therein; adjustment means for increasing or diminishing the length of said connecting-rod; a reciprocable lever; a pin on the lever, and operable in the said slot.

10. The combination in a loom for weaving pile fabrics of the pile wire; means for inserting and withdrawing the pile wire; a knife mounted on the carrier; a connecting-rod connected to the knife-carrier and having a slot therein; a pivoted lever; a pin on the lever and engaging the said slot; a crank shaft; a crank arm on the crank shaft; and a link connecting the crank arm with the lever.

11. The combination in a loom for weaving fabrics of a pile wire; a knife-carrier; a knife mounted on the carrier; a slide for inserting and withdrawing the pile wire; a pivoted double-arm sweep lever; a crank shaft; a crank arm on the crank shaft and connected to one arm of the sweep lever; a connecting-rod connected to the other arm of the sweep lever and to the slide; a connecting-rod connected to the knife-carrier and having a slot therein; a pivoted lever; a pin on the lever and engaging the said slot; and a link connecting the crank arm with the latter lever.

12. The combination, in a loom for weaving pile fabrics, of the pile wire; means for inserting and withdrawing the pile wire; a pile-cutting knife carrier; knife-guiding means movable with the knife carrier and against the pile wire; a cam having a high and low portion; a spring-pressed shoe secured to the knife carrier and operable against the said cam; means for moving the knife carrier, said movement of the knife carrier operating to cut the pile warp and to move the spring-pressed shoe onto the low and high portion of the cam to respectively decrease the intensity of the pressure of the guiding means against each pile wire as the latter is being withdrawn and to re-aline the guiding means against the next pile wire; said means for moving the knife carrier being operable to cause a dwell of the knife-guiding means while the spring-pressed shoe is on the low portion of the cam.

13. The combination, in a loom for weaving pile fabrics, of the pile wire; means for inserting and withdrawing the pile wire; a pile-cutting knife carrier; knife-guiding means movable with the knife carrier and against the pile wire; a cam having a high and low portion; a spring-pressed shoe secured to the knife carrier and operable against the said cam; means for moving the knife carrier, said movement of the knife carrier operating to cut the pile warp and to move the spring-pressed shoe onto the low and high portion of the cam to respectively decrease the intensity of the pressure of the guiding means against each pile wire as the latter is being withdrawn and to re-aline the guiding means against the next pile wire; said means for moving the knife carrier including a connecting rod attached to the knife carrier and having a slot, and a reciprocable lever having a pin thereon and movable within the said slot, said pin having a movement of greater length than the length of said slot.

14. The combination, in a loom for weaving pile fabrics, of the pile wire; means for inserting and withdrawing the pile wire; a pile-cutting knife carrier; knife guiding means movable with the knife carrier and against the pile wire; a cam having a high and low portion; a spring-pressed shoe secured to the knife carrier and operable against the said cam; means for moving the knife carrier, said movement of the knife carrier operating to cut the pile warp and to move the spring-pressed shoe onto the low and high portion of the cam to respectively decrease the intensity of the pressure of the guiding means against each pile wire as the latter is being withdrawn and to re-aline the guiding means against the next pile wire, said means for moving the knife carrier including a connecting rod pivotally attached to the knife carrier and having an elongated slot, and a reciprocable lever having a pin thereon and movable within the said slot, said pin having a movement of greater length than the length of the said slot, said connecting rod having a second slot leading to the first slot and forming an entrance passage for the said pin to the said first slot.

15. The combination, in a loom for weaving pile fabrics, of the pile wire; a knife for cutting the pile; knife-guiding means operable against the pile wire; and means for varying the intensity of the pressure of the said knife-guiding means against the said wire, said pressure-varying means being independent of the take up of the fabric.

16. The combination, in a pile cutting attachment for looms, of an auxiliary frame mounted on each side of the main frame of the loom, each of said auxiliary frames having the inner surfaces of two opposite sections grooved; the upper section of each frame being pivoted to the body of its respective frame; means for locking said pivoted sections to the body of the frame; blocks having extensions coöperating with the grooves of the respective frames so as to be slidable therein, each of said blocks having an aperture formed therein; friction plates adapted to slide within said apertures; bars slidably supported within said apertures and between said friction plates; means operable on the friction plate to cause a constant frictional pressure on the bars; means operable on said plates to increase or diminish the friction on said bars; a plurality of knives pivotally supported on one of said bars; and means for moving the other of said bars to lower and raise the knives into and out of contact with the pile threads and to reciprocate the knife-supporting bar.

17. The combination, in a pile cutting attachment for looms, of an auxiliary frame mounted on each side of the main frame of the loom, each of said auxiliary frames having the inner surfaces of the upper and lower sections grooved; one of said sections being pivoted to the body of the frame; means for locking said pivoted sections to the body of the frame; blocks having extensions coöperating with the grooves of the respective frames so as to be slidable therein, each of said blocks having an aperture formed therein; friction plates adapted to slide within said apertures; bars slidably supported within said apertures and between said friction plates; springs operable on certain of the friction plates to cause constant frictional pressure on the bars; means operable on said plates to increase or diminish the friction on said bars; a plurality of knives supported on one of said bars; and means for moving the other of said bars to lower and raise the knives into and out of engagement with the pile threads and to reciprocate the said knife-supporting bar.

18. The combination in a loom for weaving pile fabrics of a plurality of knives; means for supporting the knives above the pile warps; a series of pile wires, each of said pile wires having a groove formed therein; means for inserting and withdrawing the pile wires; means for moving the cutting edges of the knives within the grooves of the pile wires to cut the pile warp; means for tilting the said knives to a degree corresponding with the tilt of the pile wires caused by the beat up of the lay.

19. The combination, in a pile cutting mechanism for looms, of an auxiliary frame mounted on each side of the main frame of the loom, the inner surfaces of two opposite sections of each auxiliary frame having grooves therein, one of said sections of each frame being pivoted to the body portion of its respective frame; means for locking the pivoted sections; blocks having extensions coöperating with the grooves of the respective frames, each of said blocks having an aperture formed therein, the bounding surfaces of the said apertures being at an incline to the horizontal; two slidable friction plates spanning the inclined surfaces of each aperture; two bars having surfaces coincident with certain of the said inclined surfaces and passing between the friction plates of respective blocks; means operable upon certain of the friction plates to form a constant friction between the said plates and the bars; means for increasing or diminishing the intensity of the friction exerted by the plates upon the said bars; a plurality of knives pivotally supported from one of said bars; a stop mounted on one of said bars; projections on one of said bars and engaging respective knives; and means for moving one of said bars independently of the other bar and against the action of the friction plates to lower and raise the cutting edges of the knives into and out of contact with the pile warp and for reciprocating both bars simultaneously to move the cutting edges of the knives to cut the pile warp.

20. The combination in a loom for weaving pile fabrics of a bar slidably mounted adjacent the pile warp; a second bar slidably mounted above the first bar; a knife pivoted on the upper bar and having a slot adjacent the lower bar; and a projection on the lower bar and engaging the slot.

21. The combination in a loom for weaving pile fabrics of a bar slidably mounted adjacent the pile warp; a second bar slidably mounted above the first bar; a plurality of knives pivoted on the upper bar, each of said knives having a slot adjacent the lower bar; and a plurality of projections on the lower bar and engaging the slots of respective knives.

22. The combination in a loom for weaving pile fabrics of a plurality of knives; a series of pile wires, each of said pile wires having a groove formed therein; means for inserting and withdrawing the pile wires; means for keeping the wires in a prescribed path while they are being withdrawn; means for moving the knives adjacent the grooves to cut the pile warp; and means for tilting the cutting edges of the knives to agree with the tilt of the wire caused by the "beat up" of the lay.

23. The combination in a loom for weaving pile fabrics of a plurality of knives; a series of pile wires, each of said pile wires having a groove formed therein; means for moving the knives into the grooves of the wire to cut the pile warp; a carrier for the knives; means attached to the knife-carrier and adapted to engage a pile wire after the pile thereon has been cut to guide the movement of the knives in the groove of another wire.

24. The combination in a loom for weaving pile fabrics of a plurality of knives; a series of pile wires, each of said pile wires having a groove formed therein; means for inserting and withdrawing the pile wires; means for keeping the wires in a prescribed path while they are being withdrawn; means for moving the knives adjacent the grooves to cut the pile warp; means for keeping the pile wire from rising during and after the cutting of the pile warp.

25. The combination in a loom for weaving pile fabrics of a plurality of knives; a series of pile wires, each of said wires having a groove formed therein; a carrier for the knives; means for moving the carrier; means attached to the carrier for guiding said knives in the grooves of said wire; a cam; a spring-pressed shoe carried by the knife-carrier and operable on said cam to move the knife-carrier in a direction opposite to the "take up."

26. The combination, in a loom for weaving pile fabrics of the pile wire; a knife carrier; a plurality of knives on the knife carrier; knife-guiding means on the carrier and operable against the pile wire; and means for varying the intensity of the pressure of the said knife-guiding means against the said wire, said pressure-varying means being independent of the take up of the fabric.

27. The combination, in a pile cutting attachment for looms, of an auxiliary frame mounted on each side of the main frame of the loom, the inner surfaces of two opposite sections of each auxiliary frame having guideways, one of said sections of each frame being pivoted to the body portion of its respective frame; means for locking the pivoted section; blocks having extensions coöperating with the guideways of the respective frames, each of said blocks having an aperture formed therein, the bound surfaces of the said apertures being at an incline to the plane of passage of the woven fabric; two slidable friction plates spanning the inclined surfaces of each aperture; two bars having surfaces coincident with certain of the said incline surfaces and passing between the friction plates of respective blocks; means operable upon certain of the friction plates to form a constant friction between the said plates and the bars; means for increasing or diminishing the intensity of the friction exerted by the plates upon the said bars; a plurality of knives movably supported from one of said bars; and means for moving one of the said bars independently of the other bar and against the action of the friction plates to lower and raise the cutting edges of the knives into and out of contact with the pile warp and for reciprocating both bars simultaneously to move the cutting edges of the knives to cut the pile threads.

In testimony whereof, I have signed my name to this specification, in the presence of two subscribing witnesses.

ALFRED F. McCOLLUM.

Witnesses:
AUGUSTUS B. COPPES,
WM. A. BARR.